US011858161B2

(12) United States Patent
Betti et al.

(10) Patent No.: US 11,858,161 B2
(45) Date of Patent: Jan. 2, 2024

(54) CUTTING MACHINE FOR TRANSVERSELY CUTTING LOGS OF PAPER MATERIAL

(71) Applicant: FUTURA S.P.A., Lu (IT)

(72) Inventors: Gabriele Betti, Capannori (IT); Ciro Guarini, Pisa (IT)

(73) Assignee: FUTURA S.P.A., Capannori (IT)

( * ) Notice: Subject to any disclaimer, the term of this patent is extended or adjusted under 35 U.S.C. 154(b) by 0 days.

(21) Appl. No.: 17/769,869

(22) PCT Filed: Nov. 11, 2020

(86) PCT No.: PCT/IT2020/050275
§ 371 (c)(1),
(2) Date: Apr. 18, 2022

(87) PCT Pub. No.: WO2021/106020
PCT Pub. Date: Jun. 3, 2021

(65) Prior Publication Data

US 2022/0362959 A1 Nov. 17, 2022

(30) Foreign Application Priority Data

Nov. 25, 2019 (IT) ........................ 102019000022044

(51) Int. Cl.
*B26D 7/12* (2006.01)
*B26D 1/16* (2006.01)

(52) U.S. Cl.
CPC ................. *B26D 7/12* (2013.01); *B26D 1/16* (2013.01); *B26D 2210/11* (2013.01)

(58) Field of Classification Search
CPC .... B26D 7/12; B26D 3/16; B24B 3/46; B24B 3/36; B24B 3/368
See application file for complete search history.

(56) References Cited

U.S. PATENT DOCUMENTS 4,584,917 A 4/1986 Blom
2012/0184186 A1* 7/2012 Graham, Jr. ........... B23D 63/14 451/45

FOREIGN PATENT DOCUMENTS

CN 100418701 C * 9/2008 ............. B24B 19/14
CN 107336087 A * 11/2017
(Continued)

OTHER PUBLICATIONS

International Search Report and Written Opinion of the International Searching Authority dated Mar. 3, 2021 in corresponding International application No. PCT/IT2020/050275; 9 pages.

*Primary Examiner* — Jennifer S Matthews
(74) *Attorney, Agent, or Firm* — Maier & Maier, PLLC

(57) ABSTRACT

A cutting machine for the transversal cutting of paper material logs, including: a structure on which are moved the logs; a cutting unit including a blade; at least one sharpening unit with two grinding wheels; a positioning device for positioning the grinding wheels with respect to the blade. The positioning device includes: a primary carriage and two secondary carriages supported by the primary carriage; a sensor for detecting the radius of the blade and configured to stop the primary carriage when the grinding wheels are arranged with the respective axes at a given distance from the axis of the blade. In a second phase of positioning the grinding wheels, the secondary carriages are controlled so as to bring the abrasive side of the wheels into contact with the blade.

8 Claims, 6 Drawing Sheets

(56) References Cited

FOREIGN PATENT DOCUMENTS

| | | | | |
|---|---|---|---|---|
| EP | 0335332 | B1 | * | 8/1992 |
| EP | 3194128 | B1 | | 9/2018 |
| WO | 2004/039544 | A1 | | 5/2004 |
| WO | 2016/030125 | A1 | | 3/2016 |
| WO | 2019/016667 | A1 | | 1/2019 |

* cited by examiner

CUTTING MACHINE FOR TRANSVERSELY CUTTING LOGS OF PAPER MATERIAL

FIELD

The present invention relates to a cutting-off machine for the transversal cutting of logs of paper material.

BACKGROUND

It is known that rolls of toilet paper, kitchen paper and paper for similar uses are obtained from the transversal cutting of rolls of greater length, commonly called "logs" and produced by machines called "rewinders" in which a predetermined amount of a paper material, consisting of one or more overlapping paper plies, is wrapped around itself, i.e. around cardboard tubes called "cores". Generally, the logs produced by the rewinders are conveyed to a buffer store and, from this, to machines, called "cut-off machines" which perform the aforementioned transverse cut. Generally, the cutting-off machines have a platform on which guide channels for the logs are defined and, downstream of said channels, a cutting unit which comprises a disk blade suitably activated and moved to determine the transversal cut of the logs at a programmed rate in function of the length of the rolls to be obtained from the logs. The blades are usually associated with grinding wheels which cyclically intervene to restore the cutting profile of the blades themselves. Periodically, the blades of the cutting-off must be replaced due to wear which progressively reduces both the diameter and the cutting performance. Whenever a worn blade is replaced with a new one, the position of the grinding wheels relative to the blade must be adjusted.

EP3194128B1 discloses a machine for the transversal cutting of logs of paper material comprising an advancement path for the logs to be cut, a cutting unit with a replaceable disk-shaped blade that is supported in such a way as to be able to rotate around its own axis while it is subjected to a cyclic movement for cutting the logs and to allow the advancement of the logs along the advancement path, and a sharpening unit with two grinding wheels configured and controlled to intervene on the disk-shaped blade when the latter is to be sharpened. The grinding wheels are mounted on a support system comprising a mechanism for controlled approach of the grinding wheels to the blade configured to move each grinding wheel in a direction substantially parallel to its own rotation axis. Said mechanism acts in such a way as to bring a support slide of each grinding wheel to a nominal position relative to the blade, and to bring the grinding wheel close to the blade in a controlled manner by moving the grinding wheel with respect to the slide which is kept in said nominal position.

SUMMARY

The main object of the present invention is to propose a machine for cutting paper logs in which the positioning of the grinding wheels with respect to the blade replaced from time to time is automated and in which said positioning is substantially independent of the diameter of the blade.

This result has been achieved, in accordance with the present invention, by adopting the idea of making a machine having the characteristics indicated in claim 1. Other characteristics of the present invention are the subject of the dependent claims. Thanks to the present invention, it is possible to perform the positioning of the grinding wheels automatically, in a shorter time than the positioning performed manually and with greater operational safety since this operation does not require operators to access the area of the machine that houses the blade. Furthermore, a device for positioning the grinding wheels in a machine according to the present invention has a relatively simple structure and integrates an effective mechanism for recognizing the desired position for the grinding wheels.

BRIEF DESCRIPTION OF THE DRAWINGS

These and further advantages and characteristics of the present invention will be more and better evident to every person skilled in the art thanks to the following description and the attached drawings, provided by way of example but not to be considered in a limiting sense, in which.

DETAILED DESCRIPTION OF THE EMBODIMENTS

Reduced to its essential structure and with reference to the figures of the attached drawings, a cutting-off machine to which a cutting unit is applicable according to the present invention is of the type comprising:

- a structure (SC) on which the logs to be transversely cut are moved in order to obtain rolls of shorter length;
- a cutting unit (CU) arranged at a predetermined point of said structure (SC) and comprising a support plate (1)

for a blade (2) which can be removably connected to a respective rotary actuator (20) arranged at one end of said plate (1) and able to control the rotation of the blade itself around its own axis (x-x) at a predetermined speed, said plate (1) being, in turn, constrained to a further actuator which drives it into rotation with a predetermined angular speed around an axis parallel to the axis of rotation (x-x) of the blade (2);

a sharpening unit with grinding two wheels (3) adapted to sharpen the blade (2);

a device for positioning said grinding wheels (3) with respect to the blade (2).

Figure 1:
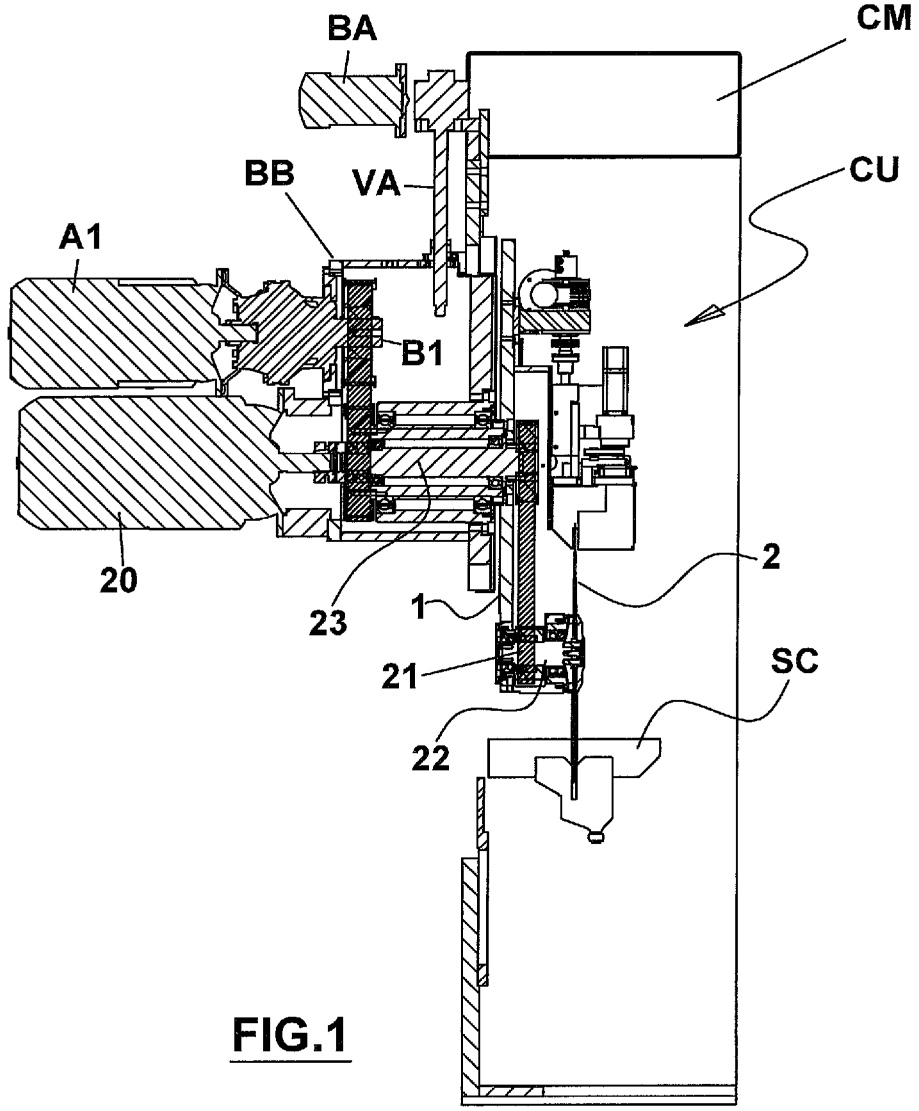
FIG. 1 is a schematic vertical sectional view of the cutting station of a cutting-off machine for transversely cutting logs of paper material with a cutting unit in accordance with the present invention.
Figure 4:
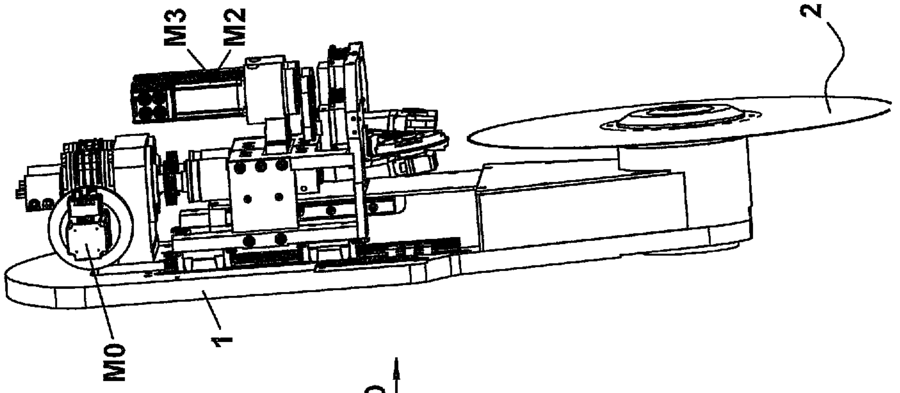
FIG. 4 is a schematic perspective view of the cutting unit shown in FIG. 2 and FIG. 3 with parts not shown to better highlight other parts.
Figure 3:
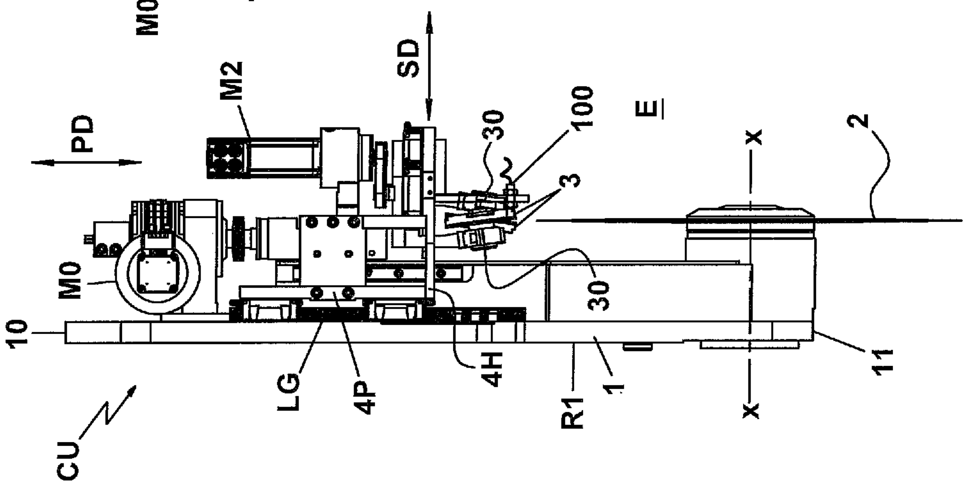
FIG. 3 is a schematic side view of the cutting unit shown in FIG. 2.
Figure 2:
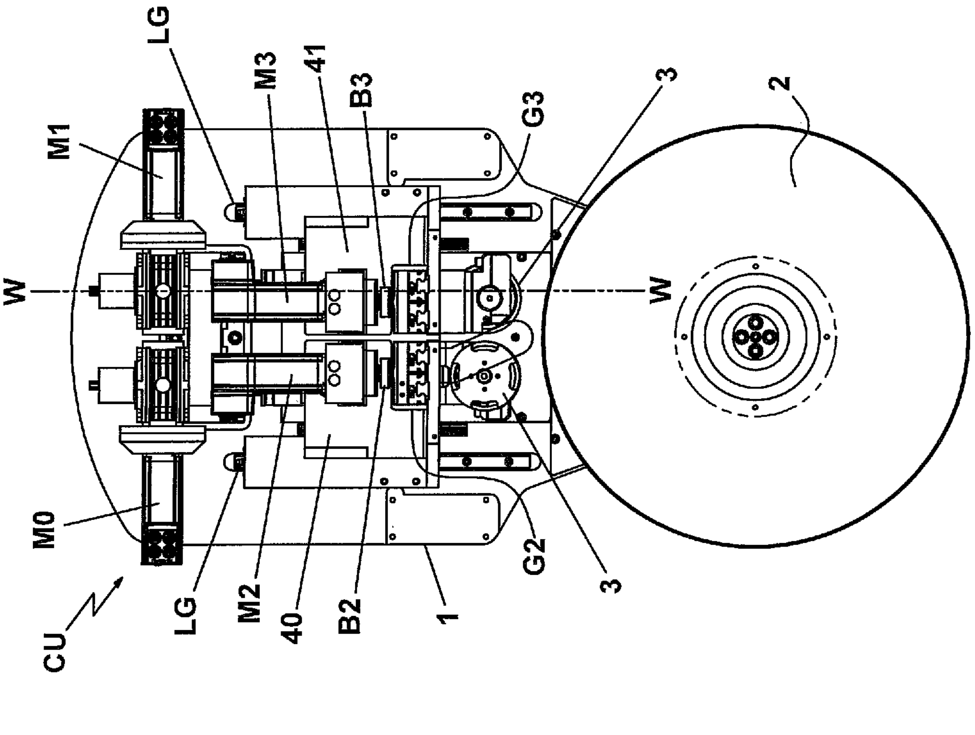
FIG. 2 is a schematic front view of a cutting unit for cutting-off machines according to the present invention.
Figure 6:
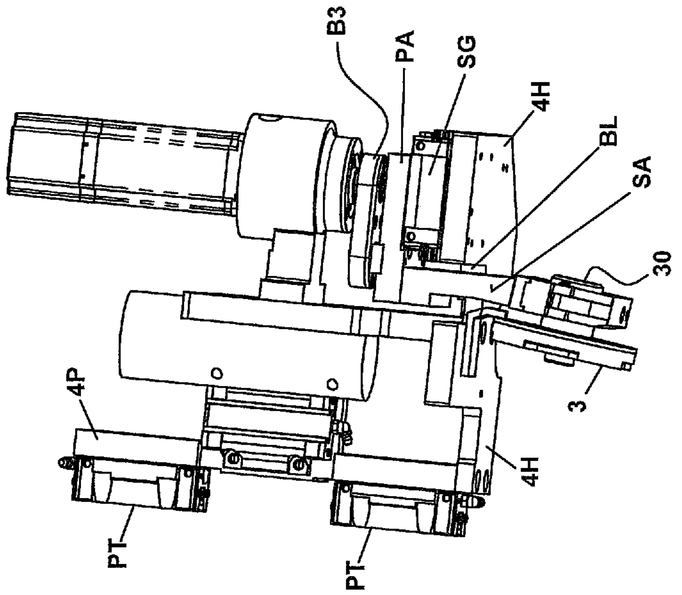
FIG. 6 is a further perspective view of a cutting unit for cutting-off machines according to the present invention, in which the blade and the sensor (100) are not shown to better highlight other parts of the same unit.
Figure 5B:
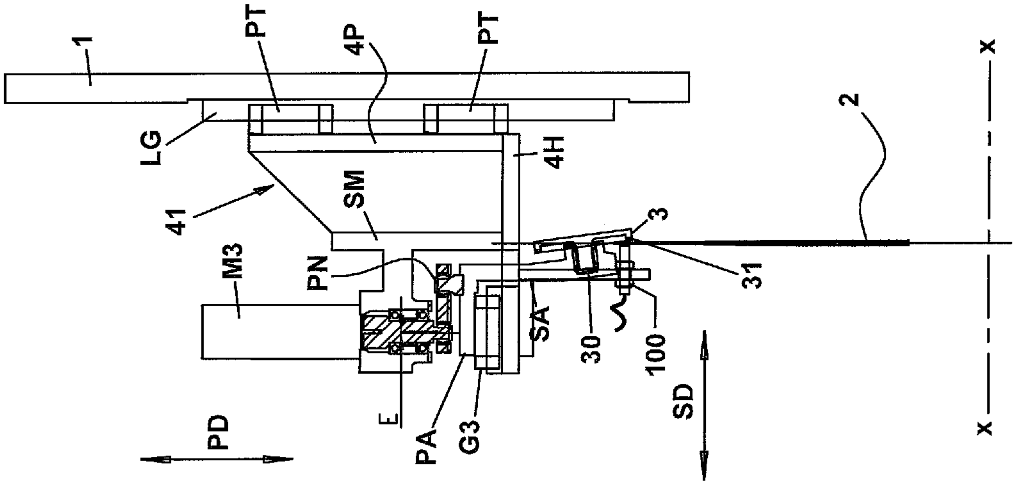
FIG. 5B is similar to FIG. 5A but it shows the cutting unit with a grinding wheel in the position of sharpening the blade.
Figure 5A:
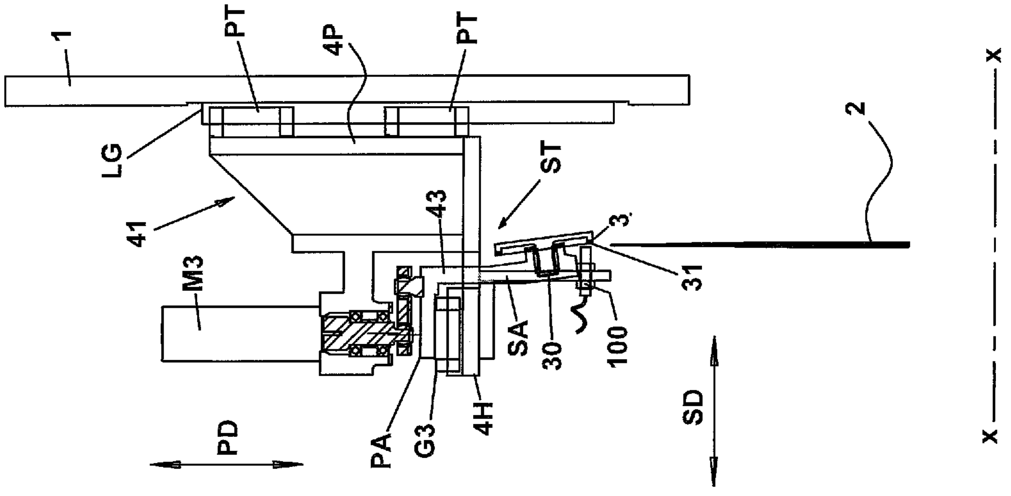
FIG. 5A is a section view along the line W-W of FIG. 2.
Figure 12:
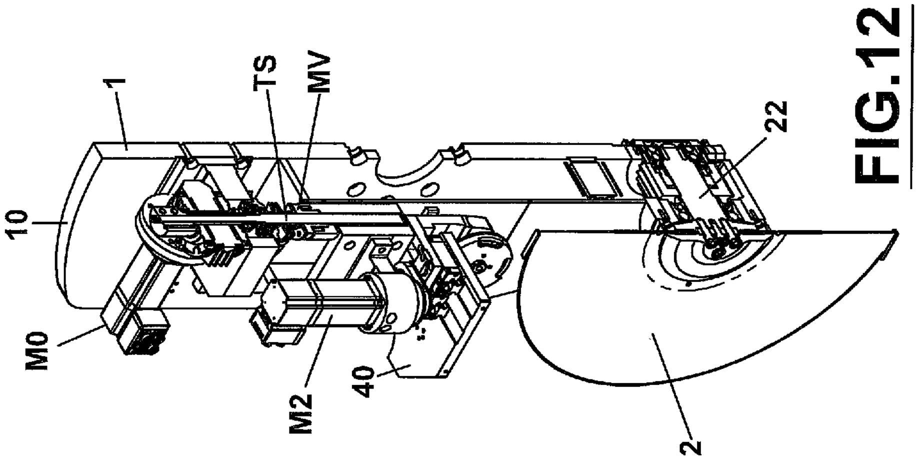
FIG. 12 is a sectional perspective view of the cutting unit of FIG. 9 in which the sensor (100) is not shown to better highlight other parts of the unit.

FIG. 1 schematically shows the main elements of a cutting-off machine (CM) in which a cutting unit in accordance with the present invention can be mounted, it being understood that the drawing is provided solely to allow the location of the cutting unit to be identified with respect to the path of the logs. It is also understood that the cutting-off machine can be made in any suitable way for executing the transversal cutting of logs of paper material, to obtain rolls of shorter length, by means of a cutting unit comprising a blade which acts transversely to the logs themselves.

In the example of FIG. 1, in accordance with a per se known construction scheme, the actuator (20) is connected to the blade (2) by means of a belt (21) which connects the central pin (22) of the same blade to the shaft (23) of the actuator (20) through a pulley arranged on the free end of the shaft (23). Furthermore, the plate (1) is rotated around an axis parallel to the axis of rotation of the blade (2) by means of a corresponding rotary actuator (A1) having a shaft (B1) parallel to the shaft (23) of the actuator that controls the rotation of the blade (2). The actuator (20), which for example is an electric motor, is integral with a box-shaped body (BB) located above said structure (SC) and inside which the belt (21) and the shafts (23) and (B1) are arranged. Said body (BB) is connected with a corresponding actuator (BA) which, through a screw (VA) acting on a nut bushing arranged on an upper side of the same body (BB), controls its vertical position, i.e. its positioning with respect to the underlying structure (SC). Consequently, by controlling the position of the body (BB), the blade (2) can be positioned at the desired height. The actuator (A1), which for example consists of an electric motor, is also integral with the body (BB).

In practice, the blade (2) rotates around a respective axis (x-x) which is parallel to the axis of rotation of the plate (1).

Figure 8:
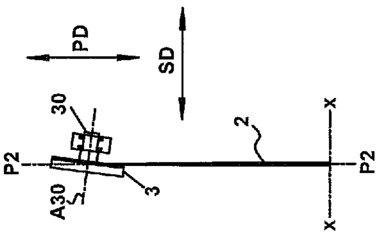
FIG. 8 is a diagram illustrating a possible orientation of a grinding wheel with respect to the plane (P2) of the blade (2)
Figure 7:
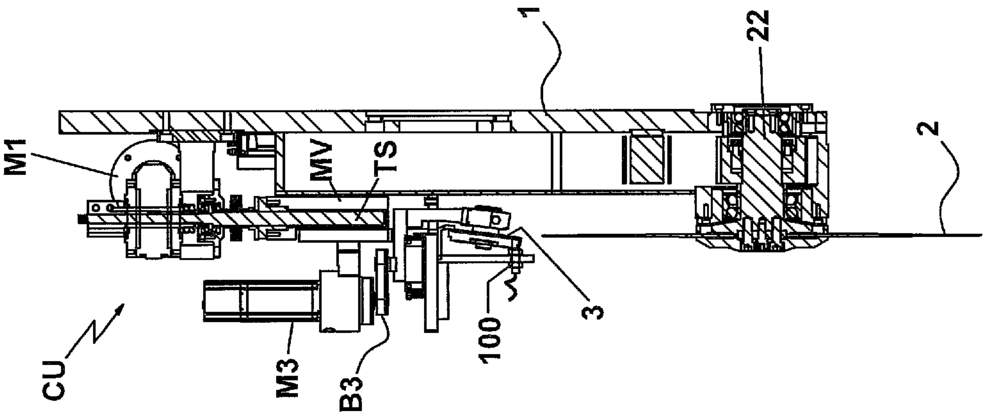
FIG. 7 is a schematic vertical sectional view of a cutting unit for cutting-off machines according to the present invention.
Figure 11:
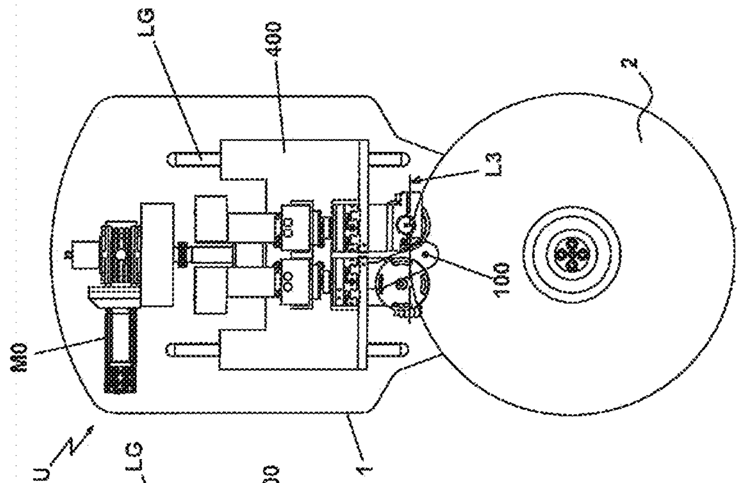
FIG. 11 shows a front view of a cutting unit according to the present invention in three possible operating positions.
Figure 10:
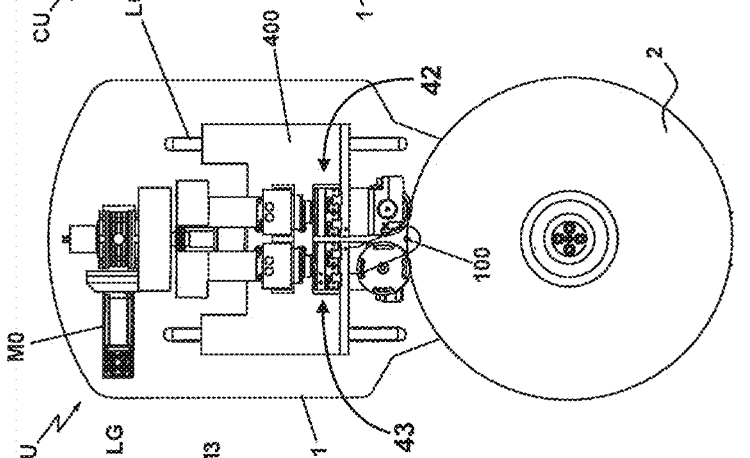
FIG. 10 shows a front view of a cutting unit according to the present invention in three possible operating positions.
Figure 9:
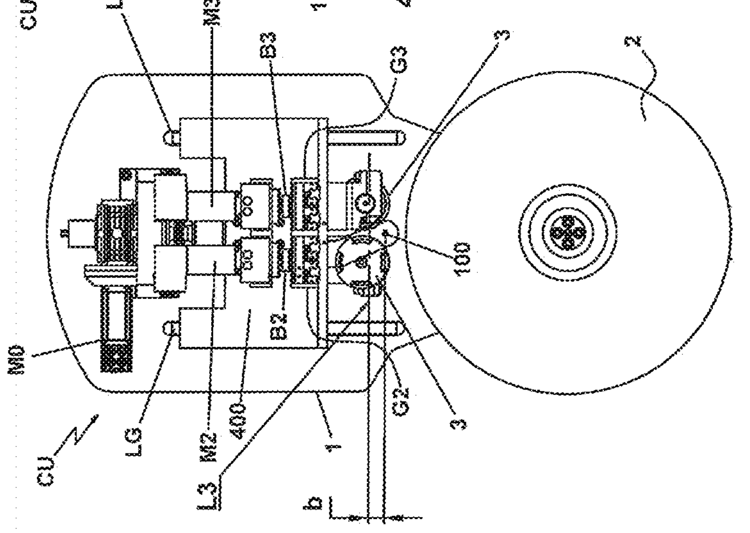
FIG. 9 shows a front view of a cutting unit according to the present invention in three possible operating positions.

A cutting unit (CU) according to a possible embodiment of the present invention comprises a plate (1) with an upper side (10), a lower side (11), a front side (F1) and a rear side (R1). The central pin (22) of the circular blade (2) is mounted on the lower side (11) of the plate (1) and is applied in a removable way on said pin in order to allow its replacement when necessary. The blade (2) is oriented parallel to the plate (1) and is positioned at a predetermined distance from the front side (F1) of the latter. On the plate (1) there are also mounted two grinding wheels (3) for sharpening the blade (2) and a device for positioning the grinding wheels (3) with respect to the blade (2). Each grinding wheel (3) is applied on a respective support shaft (30) whose axis (A30) has a predetermined inclination with respect to the front side (F1) of the plate (1) and, consequently, with respect to a corresponding side of the blade (2). FIG. 8 schematically shows the spindle (30) supporting a grinding wheel (3), the respective axis (A30), the inclination of the grinding wheel (3) in the sharpening position with respect to a side (A2) of the blade (2) and the lying plane (P2) of the latter.

In accordance with the present invention, the aforementioned grinding wheel positioning device (3) comprises:

a primary carriage (4) movable parallel to the plate (1) according to a primary movement direction (PD);

two secondary carriages (42, 43) connected to the primary carriage (4) and individually movable according to a secondary movement direction (SD) orthogonal to said primary movement direction (PD), each secondary carriage (42, 43) having a seat for supporting the shaft (30) of a corresponding grinding wheel (3).

In practice, the primary movement direction (PD) is a direction parallel to the plane (P2) where the blade (2) lies, i.e. a radial direction with respect to the latter, while the secondary movement direction (SD) is a direction parallel to the axis (x-x) of rotation of the blade (2).

The primary carriage (4) can consist of two independent units (40, 41) to each of which a corresponding secondary carriage (42, 43) is connected. Alternatively, the primary carriage can consist of a single unit (400) to which both the secondary carriages (42, 43) are connected.

With reference to the example shown in FIGS. 2-7, the primary carriage (4) consists of two independent units, each of which consists of a body (40, 41) constrained to the internal side (F1) of the plate (1) by means of a rectilinear guide (LG) which allows its guided sliding along the primary movement direction (PD). The sliding of each body (40, 41) along the primary movement direction (PD) is controlled by a corresponding electric motor (M0, M1). Each motor (M0, M1) is fixed on the internal side (F1) of the plate (1) and drives a threaded shaft (TS) which engages a corresponding nut bushing (MV) formed on each body (40, 41). Therefore, each body (40, 41) can be moved independently from the other body by the respective motor (M0, M1) along the primary movement direction (PD).

Each of said bodies (40, 41) has a first side (4P) parallel to the internal side (F1) of the plate (1) and a second side (4H) orthogonal and below the first side (4P). The first side (4P) slides along the respective guide (LG). The second side (4H) constitutes a bracket structure whose function is indicated below. In practice, each of said bodies (40, 41), seen laterally, has a structure with a part (4P) parallel to the internal side (F1) of the plate (1) and a part (4H) orthogonal to the same internal side (F1) of the plate (1) and oriented towards the outside (E) so as to define a shelf above the blade (2). In the example described above, the movement of the bodies (40, 41), i.e. the movement of the two units that make up the primary carriage (4), is a guided movement thanks to the presence of the guides (LG) that constrain the bodies (40, 41) to the internal side (F1) of the plate (1). The references "PT" denote two sliding blocks arranged at a predetermined distance from each other on the side (4P) of each body (40, 41) and intended to slide on said guides (LG).

Each of the secondary carriages (42, 43) has a first arm (PA) parallel to the bracket (4H) of the respective primary carriage, to which it is connected by means of a corresponding slide guide (G2, G3), and a second arm (SA) which is orthogonal to the first arm (PA) and, at its free end, supports the shaft (30) of a respective grinding wheel (3). The second arm (SA) passes through an opening (BL) of the bracket (4H), so that the grinding wheel (3) with its shaft (30) are below the bracket (4H) and the second arm (SA) is free to move in the opening (BL) according to the secondary movement direction (SD). A connecting rod (B2, B3) is connected to the first arm (PA) of each secondary carriage (42, 43) and is connected to a corresponding electric motor (M2, M3).

Each motor (M2, M3) is supported by a surface (SM) which each primary carriage (40, 41) has at a predetermined distance from its side (4P) parallel to the plate (1). Each connecting rod is connected to the first arm (PA) by means of a pin (PN) orthogonal both to the connecting rod and to the first arm. Therefore, each motor (M2, M3) can move the respective secondary carriage (42, 43) according to the secondary movement direction (SD). This movement is a guided movement since each secondary carriage is connected to the primary carriage by means of a respective slide (G2, G3) which, in fact, is oriented according to the secondary direction (SD).

Therefore, each grinding wheel (3) is supported by the cutting unit (CU) in such a way that it can be moved both according to the primary movement direction (PD) and the secondary movement direction (SD). In fact, the bodies (40, 41) that make up the primary carriage (4) can be moved in the primary movement direction (PD) by means of the motors (M0, M1), while the secondary carriages (42, 43) can be moved on the primary carriage along the secondary movement direction (SD) by the motors (M2, M3).

The grinding wheels (3) are oriented with their respective grinding surfaces (31) towards the plane (P2) where the blade (2) lies.

Figure 14:
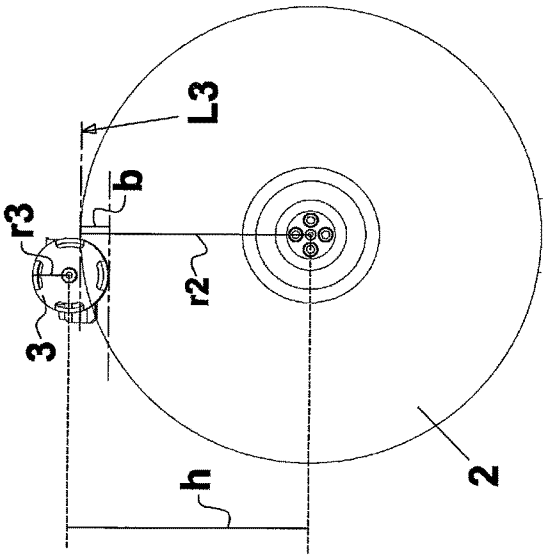
FIG. 14 is a diagram that represents some geometric parameters relating to the position of the grinding wheels with respect to the blade of the cutting unit.

The primary carriage is provided, in correspondence with its lower side, i.e. the side facing the blade (2), with an optical sensor (100) whose function is described below. For example, the optical sensor (100) is mounted below the bracket (4H) of any of the bodies (40, 41) previously described. The optical axis (101) of the sensor (100) is spaced by a predetermined value (b) from a reference line, which can be the so-called "dipping line" (3L) of the grinding wheels (3), so as to intercept the cutting edge (200) of the blade (2), when the primary carriage approaches the latter, before the grinding wheels (3) are arranged in the sharpening position on the blade. The dipping line is a reference line of each grinding wheel (3), i.e. a known geometric parameter supplied by the manufacturer. This parameter identifies the correct position of the grinding wheel with respect to the blade for sharpening purposes. In practice, for the correct sharpening of the blade, the dipping line of the grinding wheel must be in a position of tangency to the cutting edge of the blade, as shown in the diagram in FIG. 14. In this condition, the abrasive part of the grinding wheel interferes correctly with the area of the blade to be sharpened, i.e. an optimal contact condition is achieved between the grinding wheel and the blade during the sharpening phase.

A possible operating mode of the device described above is the following.

When a new blade is mounted on the cutting unit (CU), the primary carriage is moved along the primary movement direction (PD). Then, the optical sensor (100) detects the edge (200) of the blade (2), and the run of the primary carriage continues until it stops when the optical axis (101) has passed the said edge (200) of a value corresponding to the value (b) previously described. For this purpose, the optical sensor (100) is connected to the motors (M0, M1). In this way, the grinding wheels (3) are correctly positioned with respect to the two sides of the blade (2) for the subsequent sharpening phase. At this point, the secondary carriages (42, 43) are moved along the secondary movement direction (SD) by the motors (M2, M3) so that each grinding wheel (3) is brought with the respective surface (31) in contact with the corresponding side of the blade (2) which rotates around its own axis (x-x). This contact is detected through the same blade (2) which, in fact, undergoes a slowdown as a consequence of the contact itself. Normally the motor (20) that drives the blade is controlled by a system equipped with a control function that ensures a constant rotation speed of the blade around the rotation axis (x-x) during the transversal cutting of the logs. When the grinding wheel positioning device is in operation, whereby the grinding wheels are moved along the secondary movement direction (SD) as previously mentioned, the aforementioned motor (20) control function is temporarily deactivated. The contact of the wheels (3) with the blade (2) causes a slowdown of the latter and this condition is assumed as an indicator of the contact between the wheels and the blade. When this occurs, the run of the secondary carriages in the direction (SD) is stopped. Therefore, the grinding wheels (3) will always be correctly positioned on the blade (2) regardless of the state of wear, and therefore regardless of the actual diameter, of the blade itself.

Since the run of the primary carriage towards the blade (2) is controlled by the optical sensor (100) which detects the cutting edge (200) of the blade, the stopping point of the primary carriage at the end of this run is not predefined but it depends on the diameter, and therefore on the degree of wear, of the blade mounted in the cutting unit.

In practice, in a first phase of positioning the grinding wheels (3), the actuators (M0, M1) that move the units (40, 41) of the primary carriage are controlled by an optical sensor (100) which is connected to the same primary carriage and detects the cutting edge (200) of the blade (2) and interrupts the run of the primary carriage along the primary movement direction (PD) after this detection, so that the run of the primary carriage is given by the length of a path comprised between the initial waiting position and a position of detection of the cutting edge (200) by the optical sensor (100) increased by a predetermined value (b). And, in a second step of positioning the grinding wheels (3), the secondary actuators (42, 43) are controlled so as to bring the abrasive side of the wheels (3) into contact with the blade (2).

In practice, the value (b) measures the difference, along the direction (PD) of movement of the primary carriage, between the position of the optical sensor (100) projected on the plane (P2) of the blade (2) and the position of the line (L3) of the grinding wheels (3) projected on the same plane (P2).

As previously mentioned, the primary carriage can be made up of only one unit (400), rather than two independent units. In this case, as shown in FIGS. 9-12, only one motor (M0) is provided for moving the single unit (400). Also in this case, the primary carriage is provided with the optical sensor (100) which controls its run towards the blade (2) as previously described.

In relation to what has been described above, a cutting-off machine for the transversal cutting of logs in accordance with the present invention comprises:

- a structure (SC) on which are moved the logs to be transversely cut in order to obtain rolls of shorter length;
- a cutting unit (CU) arranged at a predetermined point of said structure (SC) and comprising a support plate (1) for a blade (2) that is removably connectable to a respective rotary actuator (20) able to determine the rotation of the same blade about its own axis (x-x) at a predetermined speed, said plate (1) being, in turn, constrained to a further actuator which drags it into rotation with a predetermined angular speed about an axis parallel to the rotation axis (x-x) of the blade (2), the blade (2) being arranged along a lying plane (P2)

perpendicular to said rotation axis (x-x) at a predetermined position in the cutting unit (CU);

at least one sharpening unit with two grinding wheels (3) suitably arranged to sharpen the blade (2) on opposite sides with respect to said plane (P2) and provided with an abrasive side (31), said grinding wheels (3) being circular wheels of predetermined radius;

a positioning device for positioning said grinding wheels (3) with respect to the blade (2) arranged on each sharpening unit, by means of which each grinding wheel (3) is placed in a position of contact with the blade (2) in a sharpening step of the latter starting from an initial inoperative position;

wherein said positioning device comprises a primary carriage (40, 41; 400) which can be moved along a primary direction (PD) radially with respect to the blade (2), starting from an initial waiting position, by means of one or more primary actuators (M0, M1), and two secondary carriages (42, 43) each of which is supported by the primary carriage (40, 41; 400) and can be moved along a secondary direction (SD) parallel to the rotation axis of the blade (2) by means of two secondary actuators (M2, M3);

in a first step of positioning the grinding wheels (3), said one or more actuators (M0, M1) moving the primary carriage (40, 41; 400) are controlled by a sensor (100) which detects the radius of the blade (2) and stops the primary carriage along the primary direction (PD) when the grinding wheels are arranged with the respective axes, with respect to the axis of the blade, at a distance (k) equal to the radius (r2) of the blade increased by the radius (r3) of the grinding wheels and decreased by a predetermined value (b);

in a second phase of positioning the grinding wheels (3), the secondary actuators (42, 43) are controlled so as to bring the abrasive side of the wheels (3) into contact with the blade (2).

The optical sensor (100) can be replaced by a sensor of another type, for example an inductive sensor or an ultrasonic sensor. The cutting-off machine can also be provided with two sharpening units of the type described above. In this case, the two sharpening units are placed in different positions with respect to the blade (2) for acting each on a different area of the blade. This can be useful in the case of circular blades of large diameter, or of circular blades with bevels of different shapes along the radius, so that each sharpening unit can act on a corresponding area of the blade. Preferably, the two sharpening units are identical to each other.

Figure 13:
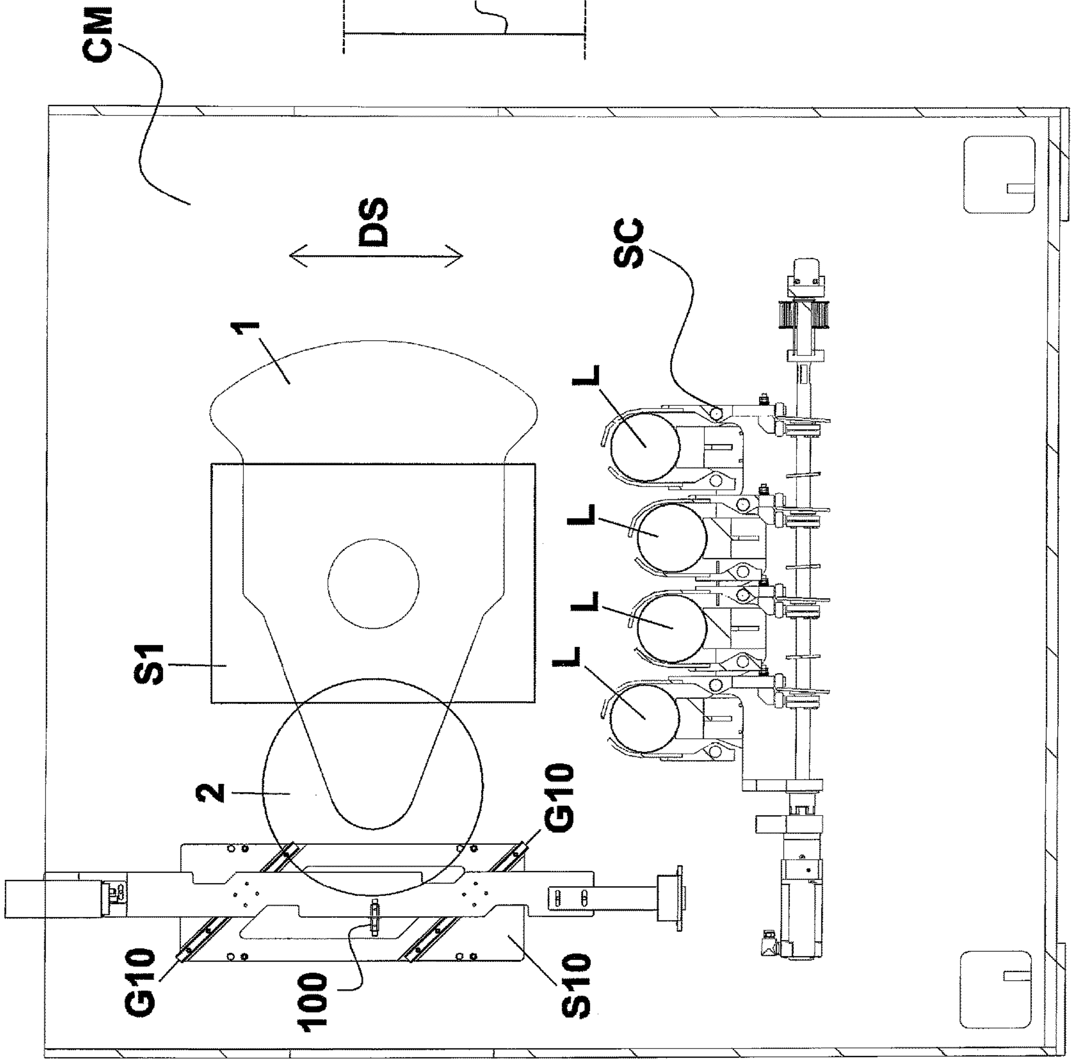
FIG. 13, in which the logs subjected to cutting are indicated with the reference "L", schematically represents a further embodiment of the present invention.

With reference to the example shown in FIG. 13, the sensor (100) is associated with a slide (S10) mounted on guides (G10) oriented diagonally with respect to the direction (DS) of movement of a further slide (S1) on which the plate (1) is mounted. In a per se known manner, the plate (1) is moved towards the structure (SC). However, the movement of the plate is a function of the diameter of the blade (2) detected by the sensor (100). In accordance with the present invention, the actual diameter of the blade (2) is used to control the run of the primary carriage (40, 41; 400), not shown in FIG. 13, towards the same blade in the sharpening phase. In all the examples described above, the sensor (100) detects the actual diameter of the blade (2). In fact, the position of the center of the blade with respect to the plate (1) is known and invariable, so that the detection of the cutting edge of the blade corresponds to the detection of the diameter of the latter.

Therefore, in accordance with the present invention, the movement of the primary carriage (40, 41; 400) along the primary movement direction (PD) is always controlled by a sensor which detects the diameter of the blade (2), so that, independently from the diameter of the latter, the grinding wheels (3) are always brought to the correct sharpening position, in which the dipping line of the grinding wheels is tangent to the cutting edge of the blade. In other words, in a first phase of positioning the grinding wheels (3), said one or more actuators (M0, M1) used to move the primary carriage (40, 41; 400) are controlled by a sensor (100) which detects the radius of the blade (2) and drives the interruption of the run of the primary carriage along the primary movement direction (PD) when the grinding wheels are arranged with their respective axes, relative to the rotation axis of the blade, at a distance (k) equal to radius (r2) of the blade increased by the radius (r3) of the grinding wheels and decreased by a predetermined value (b). It is noted that the radius (r3) of the grinding wheels (3) is a known value.

In practice, the details of execution may in any case vary in an equivalent manner as regards the individual elements described and illustrated without thereby departing from the idea of the solution adopted and therefore remaining within the limits of the protection granted by this patent in accordance with the following claims.

The invention claimed is:

1. A cutting machine for the transversal cutting of paper material logs, comprising:

a structure on which the logs are moved to be transversely cut in order to obtain rolls of shorter length;

a cutting unit arranged at a predetermined point of said structure and comprising a support plate for a blade that is removably connectable to a respective rotary actuator that controls a rotation of the same blade about an axis of the blade at a predetermined speed, said plate being constrained to a further actuator which drags it into rotation with a predetermined angular speed about an axis parallel to the rotation axis of the blade, the blade being arranged along a plane lying perpendicular to said rotation axis at a predetermined position in the cutting unit;

at least one sharpening unit with two grinding wheels, each having an abrasive side, arranged to sharpen the blade on opposite sides with respect to said plane, said grinding wheels being circular wheels having a predetermined radius;

a positioning device for positioning said grinding wheels with respect to the blade arranged on each sharpening unit, by which each grinding wheel is placed in a position of contact with the blade in a blade sharpening position starting from an initial inoperative position;

wherein—said positioning device comprises a primary carriage movable along a primary direction radially with respect to the blade, starting from an initial waiting position, by one or more primary actuators, and two secondary carriages each of which is supported by the primary carriage and can be moved along a secondary direction parallel to the rotation axis of the blade by two secondary actuators;

in a first operation of positioning the grinding wheels, said one or more actuators moving the primary carriage are controlled by a sensor which detects the radius of the blade and stops the primary carriage along the primary direction when the grinding wheels are positioned with the respective axes, with respect to the axis of the blade, at a distance equal to the sum of the radius of the blade and the radius of the grinding wheels minus a predetermined value such that the grinding wheels are moved, along the primary direction, to a position in which the respective abrasive sides can subsequently be brought into contact with the blade;

in a second operation of positioning the grinding wheels, the secondary carriages are controlled so as to bring the abrasive side of the grinding wheels into contact with the blade.

2. The cutting machine according to claim 1, wherein said sensor is connected to the primary carriage.

3. Cutting machine according to claim 1, wherein the primary carriage comprises two independent units.

4. The cutting machine according to claim 3, wherein each of said units comprises a body with a first side parallel to the inner side of the plate and a second side orthogonal and underlying the first side, in which the first side slides along a respective guide, the second side is orthogonal to the inner side of the plate and defines a bracket above the blade; and each of the secondary carriages has a first arm parallel to the bracket of the respective primary carriage, to which it is constrained by a corresponding slide guide, and a second arm which is orthogonal to the first arm and, at a free end, supports a shaft of a respective grinding wheel, the second arm passing through an opening formed in the bracket, so that the grinding wheel and the respective shaft are below the bracket and the said second arm is free to move in the opening in the secondary direction, on the first arm of each secondary carriage being connected a connecting rod which, in turn, is connected with a corresponding electric motor, each motor being supported by a surface that each said body exhibits at a predetermined distance from a side parallel to the plate, each connecting rod being connected to the first arm by a pin perpendicular to both the connecting rod and the first arm.

5. The cutting machine according to claim 1, wherein the primary carriage comprises a single unit.

6. The cutting machine according to claim 1, wherein the primary carriage is constrained to an inner side of the plate by a linear guide which allows sliding along the primary movement direction.

7. The cutting machine according to claim 1, wherein the contact between the abrasive side of the grinding wheels and the blade is detected by detecting the slowing down of the blade.

8. The cutting machine according to claim 1, wherein said sensor is an optical sensor or an inductive sensor or an ultrasonic sensor.

* * * * *